US012681705B2

(12) United States Patent
Panikkar et al.

(10) Patent No.: US 12,681,705 B2
(45) Date of Patent: Jul. 14, 2026

(54) IDENTIFYING APPLICATIONS IMPACTED BY REQUEST-RELATED ATTRIBUTE CHANGES

(71) Applicant: Dell Products L.P., Round Rock, TX (US)

(72) Inventors: Shibi Panikkar, Bangalore (IN); Sisir Samanta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 18/126,162

(22) Filed: Mar. 24, 2023

(65) Prior Publication Data

US 2024/0319974 A1     Sep. 26, 2024

(51) Int. Cl.
| | |
|---|---|
| *G06F 9/445* | (2018.01) |
| *G06F 8/41* | (2018.01) |
| *G06F 8/74* | (2018.01) |

(52) U.S. Cl.
CPC ................ G06F 8/433 (2013.01); G06F 8/74 (2013.01)

(58) Field of Classification Search
CPC ... G06F 8/433; G06F 8/34; G06F 8/36; G06F 8/74; G06F 18/2113; G06F 8/20; G06F 9/451; G06F 8/42; G06N 3/04
See application file for complete search history.

(56) References Cited

U.S. PATENT DOCUMENTS

| | | | |
|---|---|---|---|
| 2005/0091647 A1* | 4/2005 | McCollum | G06F 8/20 717/130 |
| 2010/0131916 A1* | 5/2010 | Prigge | G06Q 10/06 718/100 |
| 2019/0188006 A1* | 6/2019 | Ritter | G06F 9/541 |
| 2024/0303052 A1* | 9/2024 | Michelsen | G06F 9/44526 |

OTHER PUBLICATIONS

"Subscription Order Management", SAP Help Portal Documentation, available at: https://help.sap.com/docs/SAP_S4HANA_ON-PREMISE/95ad0cb1c441447888d695da7f3fd3d9?locale=en-US &state=PRODUCTION&version=2022.000, Version 2022, accessed Feb. 15, 2023.
Wikipedia contributors. "Coupling (computer programming)." Wikipedia, The Free Encyclopedia, available at: https://en.wikipedia.org/w/index.php?title=Coupling_(computer_programming)&oldid=1086406506#Procedural_programming (last accessed Mar. 24, 2023), last updated May 6, 2022.

* cited by examiner

*Primary Examiner* — Chuck O Kendall
(74) *Attorney, Agent, or Firm* — Ryan, Mason & Lewis, LLP

(57) ABSTRACT

Methods, apparatus, and processor-readable storage media for identifying applications impacted by request-related attribute changes are provided herein. An example method includes obtaining one or more changes to an attribute of a first application, wherein the at least one attribute is used by one or more of a plurality of applications to process a request associated with the attribute; determining one or more other attributes used by the plurality of applications that are (Continued)

600 — OBTAIN ONE OR MORE CHANGES TO AT LEAST ONE ATTRIBUTE OF A FIRST APPLICATION OF A PLURALITY OF APPLICATIONS, WHEREIN THE AT LEAST ONE ATTRIBUTE IS USED BY ONE OR MORE OF THE PLURALITY OF APPLICATIONS TO PROCESS A REQUEST ASSOCIATED WITH THE AT LEAST ONE ATTRIBUTE

602 — DETERMINE ONE OR MORE OTHER ATTRIBUTES USED BY AT LEAST ONE OF THE PLURALITY OF APPLICATIONS THAT ARE DEPENDENT ON THE AT LEAST ONE ATTRIBUTE

604 — GENERATE A DEPENDENCY MODEL FOR THE AT LEAST ONE ATTRIBUTE BASED AT LEAST IN PART ON THE ONE OR MORE OTHER ATTRIBUTES AND DEPENDENCY RELATIONSHIPS BETWEEN TWO OR MORE OF THE PLURALITY OF APPLICATIONS

606 — IDENTIFY ONE OR MORE OTHER ONES OF THE PLURALITY OF APPLICATIONS THAT ARE IMPACTED BY THE ONE OR MORE CHANGES TO THE AT LEAST ONE ATTRIBUTE BASED AT LEAST IN PART ON THE DEPENDENCY MODEL

608 — INITIATE ONE OR MORE AUTOMATED ACTIONS BASED AT LEAST IN PART ON THE IDENTIFIED ONE OR MORE OTHER APPLICATIONS dependent on the attribute; generating a dependency model for the attribute based at least in part on the one or more other attributes and dependency relationships between the plurality of applications; identifying one or more of the plurality of applications that are impacted by the one or more changes to the attribute based on the dependency model; and initiating one or more automated actions based on the identified one or more applications.

20 Claims, 8 Drawing Sheets

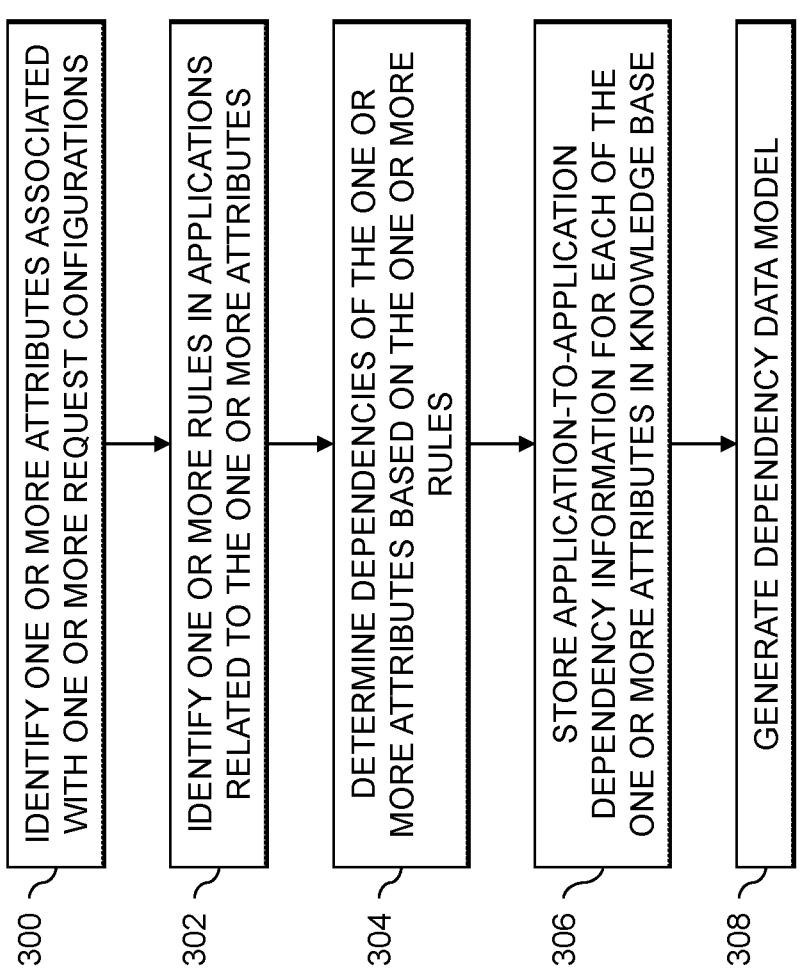

300 — IDENTIFY ONE OR MORE ATTRIBUTES ASSOCIATED WITH ONE OR MORE REQUEST CONFIGURATIONS

302 — IDENTIFY ONE OR MORE RULES IN APPLICATIONS RELATED TO THE ONE OR MORE ATTRIBUTES

304 — DETERMINE DEPENDENCIES OF THE ONE OR MORE ATTRIBUTES BASED ON THE ONE OR MORE RULES

306 — STORE APPLICATION-TO-APPLICATION DEPENDENCY INFORMATION FOR EACH OF THE ONE OR MORE ATTRIBUTES IN KNOWLEDGE BASE

308 — GENERATE DEPENDENCY DATA MODEL

FIG. 3

400 — IDENTIFY CHANGE IN ATTRIBUTE

402 — DETERMINE DIRECT DEPENDENCIES OF CHANGED ATTRIBUTE

404 — DETERMINE INDIRECT DEPENDENCIES OF CHANGED ATTRIBUTE

406 — DETERMINE CASCADING DEPENDENCIES OF CHANGED ATTRIBUTE

408 — GENERATE AND OUTPUT IMPACT INFORMATION

IDENTIFYING APPLICATIONS IMPACTED BY REQUEST-RELATED ATTRIBUTE CHANGES

FIELD

The field relates generally to information processing, and more particularly to applications associated with information processing systems.

BACKGROUND

Organizations are increasingly providing complex and configurable technologies, including as-a-service technologies. Some organizations process requests related to such technologies using complex systems involving many interconnected applications.

SUMMARY

Illustrative embodiments of the disclosure provide techniques for identifying applications impacted by request-related attribute changes. An exemplary computer-implemented method includes: obtaining one or more changes to at least one attribute of a first application of a plurality of applications, wherein the at least one attribute is used by one or more of the plurality of applications to process a request associated with the at least one attribute; determining one or more other attributes used by at least one of the plurality of applications that are dependent on the at least one attribute; generating a dependency model for the at least one attribute based at least in part on the one or more other attributes and dependency relationships between two or more of the plurality of applications; identifying one or more other ones of the plurality of applications that are impacted by the one or more changes to the at least one attribute based at least in part on the dependency model; and initiating one or more automated actions based at least in part on the identified one or more other applications.

Illustrative embodiments can provide significant advantages relative to conventional software development techniques. For example, technical problems associated with identifying and updating applications impacted by a change to at least one attribute of a request are mitigated in one or more embodiments by dynamically building a dependency model based at least in part on dependency information between individual attributes and applications and/or between pairs of attributes, and using the dependency model to determine the applications impacted by the change.

These and other illustrative embodiments described herein include, without limitation, methods, apparatus, systems, and computer program products comprising processor-readable storage media.

BRIEF DESCRIPTION OF THE DRAWINGS

FIG. 3 shows a process flow diagram for generating a dependency data model in an illustrative embodiment.

DETAILED DESCRIPTION

Figure 1:
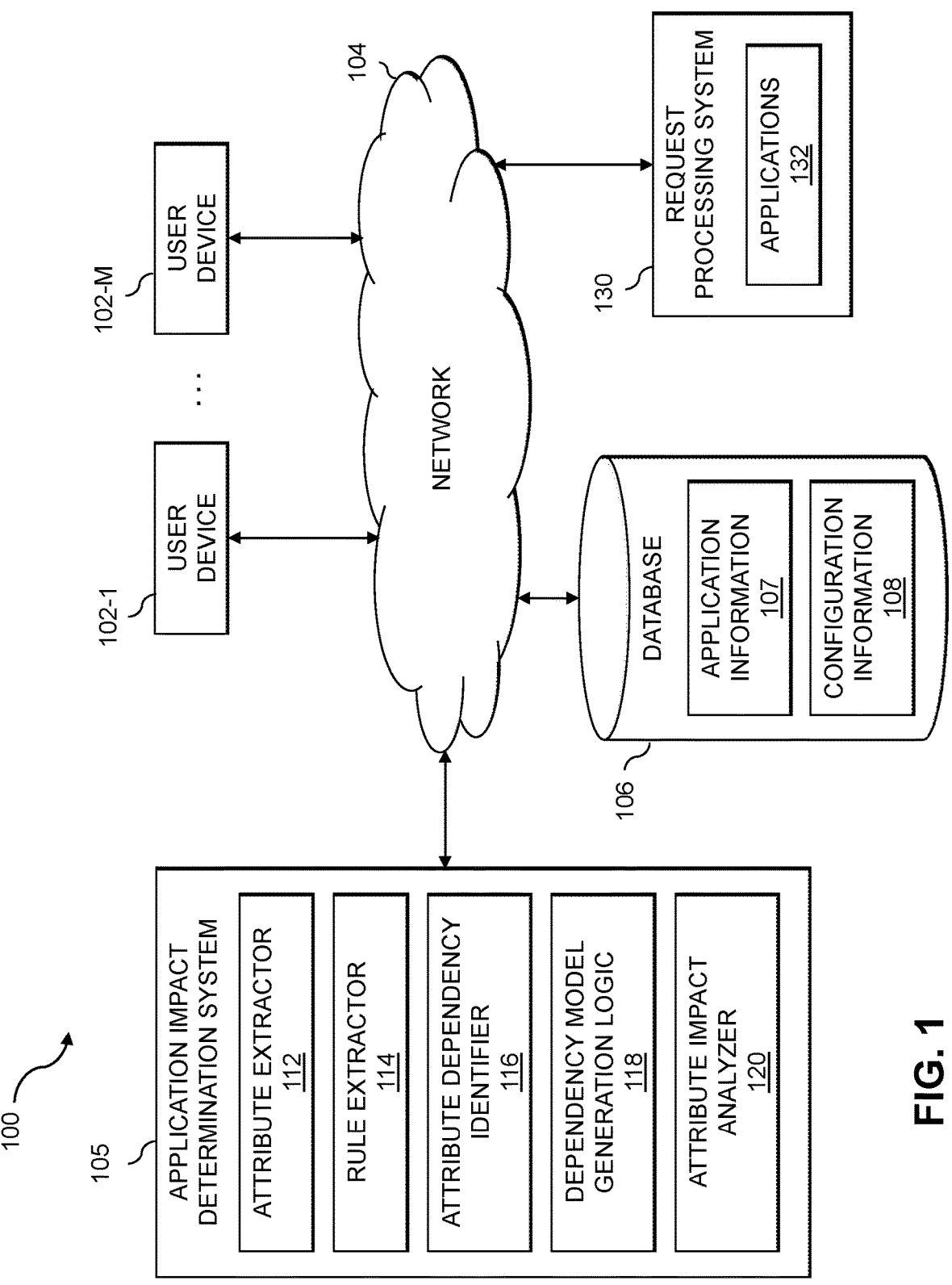
FIG. 1 shows an information processing system configured for identifying applications impacted by request-related attribute changes in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

As noted above, many organizations have developed large and complex systems, for example, to handle requests (e.g., related to order and supply chain workflows). Such systems can often include hundreds of interconnected applications for processing such requests, such as applications pertaining to supply chains, revenue systems, reporting, etc. By way of example, a user can select a particular configuration of an item (e.g., one or more products and/or one or more services) based on one or more inputs, and a request can be created that includes a set of attributes corresponding to that particular configuration (also referred to herein as a request configuration).

By way of example, in some embodiments, a user may configure a request (e.g., via a user interface) for a storage technology service. The request may include a service attribute related to how the storage technology is provided (e.g., subscription or perpetual), a storage type attribute (e.g., cloud, hybrid cloud, or local), a size attribute (e.g., indicating a storage size), a term attribute (e.g., in months or years), an add-on attribute (e.g., optional storage services, such as a customer support plan), etc. A user can select values for at least some of these attributes to configure a request for the storage technology service, for example. Different applications can use the attribute values to derive and/or to perform actions for processing the request. For example, the service attribute can be obtained by: a sales application for configuring monthly pricing for the request (as opposed to a perpetual price); an order pipeline application for configuring a subscription identifier (ID) for the request; and a subscription management application for creating a corresponding subscription (e.g., based on the subscription ID). Next, the value of the storage type attribute can then be obtained by: the sales application for determining a set of terms and/or conditions related to the cloud storage option; and a billing application that generates bills for the request (e.g., on a monthly basis).

Also, at least some of the applications can pass one or more of the attributes, or an output associated with one or more of the attributes, to another application. For example, a request may include a tax type attribute that can be set to direct or indirect. The tax type generally will directly affect a tax application, but can also indirectly affect other attributes (e.g., a location attribute and/or an offer type attribute). As a non-limiting example, the tax application can include the following rule:

```
if (Tax Type == "direct") {
    if (Offer Type == "subscription") {
        if (Country == "Country A") {
            if (Storage Type = "cloud")
                Tax = 10%;
    else if...
    }
```

Thus, it is to be appreciated that some of the applications can directly use an attribute associated with a request, whereas other applications can indirectly use attributes and one or more rules associated with the attributes to process the request. As an example, the same attribute may be used by multiple applications for performing one or more respective functions. Also, changes in one application can recursively impact one or more other applications due to changes in the corresponding output.

The relationships between applications when a given attribute is added, changed, and/or deleted, in some examples, can correspond to at least one of the following relationship types: (i) direct impact (e.g., application that directly uses the given attribute to resolve a function); (ii) indirect impact (e.g., an application that uses one or more rules involving the attribute and, possibly, one or more other attributes); and (iii) cascaded impact (e.g., an application that uses output, from another application, that corresponds to the given attribute and/or corresponds to a result of one or more rules involving the given attribute).

Changes to one or more applications in such systems can result in errors and/or unexpected behavior when processing a request. However, identifying applications impacted by such changes is often difficult. This becomes even more challenging as the number of interconnected applications and/or attributes (e.g., a request for a given item may be associated with hundreds of attributes) increases.

By way of example, consider a situation where an organization allows a configuration of a subscription item (e.g., a storage plan), and requests for the subscription item are processed using a plurality of applications. Initially, the configuration of the subscription item allows a user to select a support plan having a one-year term or a two-year term, and the organization would like to add another option for a support plan having a one-month term. Typically, individuals associated with the plurality of applications (e.g., developers and/or subject matter experts) need to meet in order to discuss what change is being made, even though some of the applications will not be affected by the change. Each application is analyzed by the respective individuals to determine the impact of the change, and then plans for implementing that change are discussed. The applications are generally analyzed separately, which can be inefficient and may not accurately identify the relationships.

One approach to address these issues involves at least one individual (e.g., a project manager) performing an analysis based on similar types of changes that were previously made to identify the applications that are potentially impacted. The individuals associated with such applications are then notified to complete a review of the changes. Another approach includes using one or more predefined workflows for changes made in different applications. For example, if there is a change to a pricing attribute in a sales application, then the workflow may include: notifying one or more developers of a billing application so that the billing application can be updated to accommodate the change of the pricing attribute, and then notifying one or more developers of a finance application so that the finance application can be updated to accommodate the change to the pricing attribute.

Each of these approaches suffers from one or more disadvantages. For example, there is no mechanism to identify cascading impact changes, and the developers making changes may be unaware of other impacted applications. Also, such approaches are inefficient and often require manually reviewing the changes and identifying the impacted applications (and the individuals associated with such applications). There are often mistakes in this process, which may require multiple rounds of review, application updates, and testing to incorporate the changes.

Some embodiments described herein provide techniques to dynamically build a model using request attributes, rules extracted from a plurality of applications, and a knowledgebase of application-to-application dependencies related to a given one of the request attributes. In some examples, a knowledgebase includes relationships between respective request attributes and affected applications. For example, at least some embodiments can obtain the offer attributes, extract attribute dependencies based on the rules (e.g., specified in one or more applications), and track application relationships in the knowledge base to dynamically create a dependency data model. When an item is changed, the changes are propagated to the dependency data model to notify a user of the applications that will be impacted by the change (e.g., direct, indirect, and cascaded). Some embodiments can also indicate a level of impact associated with the changes, such as a probability of whether the change will result in one or more errors.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an application impact determination system 105, and a request processing system 130.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the application impact determination system 105 can have at least one associated database 106 configured to store data pertaining to, for example, application information 107 (e.g., source code, dependencies, and/or other information related to applications 132 of request processing system 130). The at least one associated database 106 can also be configured to store data pertaining to configuration information 108. The configuration information 108 can be related to one or more attributes associated with requests to be processed by one or more of the applications 132 of request processing system 130.

By way of example, the request processing system 130 can process requests related to one or more items, such as products (e.g., software products, hardware products, etc.) and/or as-a-service technologies (e.g., software-as-a-service, infrastructure-as-a-service, etc.), where at least some of the items can be configured and/or customized by a user. As a non-limiting example, an organization may provide storage technologies with different options related to a type of proposal, one or more types of storage, one or more add-on services, etc. Some non-limiting examples of attributes associated with the different options can include at least one of: an offer type attribute (e.g., subscription or perpetual), a storage type attribute (e.g., cloud storage and/or local storage), an add-on service attribute (e.g., automated backup services and/or support services), and possibly one or more other attributes related to, licensing options, locations, etc. When a user configures one of these items, a request can be generated based on the options selected by the user, and can be processed by at least some of the one or more of the applications 132 of request processing system 130.

An example database 106, such as depicted in the present embodiment, can be implemented using one or more storage systems associated with the application impact determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the application impact determination system 105 are one or more input-output devices, which illustratively comprise keyboards, displays or other types of input-output devices in any combination. Such input-output devices can be used, for example, to support one or more user interfaces to the application impact determination system 105, as well as to support communication between application impact determination system 105, request processing system 130, and/or other related systems and devices not explicitly shown.

Additionally, the application impact determination system 105 in the FIG. 1 embodiment is assumed to be implemented using at least one processing device. Each such processing device generally comprises at least one processor and an associated memory, and implements one or more functional modules for controlling certain features of the application impact determination system 105.

More particularly, the application impact determination system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the application impact determination system 105 to communicate over the network 104 with the user devices 102 and/or the request processing system 130, and illustratively comprises one or more conventional transceivers.

The application impact determination system 105 further comprises an attribute extractor 112, a rule extractor 114, an attribute dependency identifier 116, dependency model generation logic 118, and an attribute impact analyzer 120.

The attribute extractor 112 extracts attributes related to one or more request configurations (e.g., from configuration information 108), and the rule extractor 114 extracts one or more rules corresponding to the request configurations. In at least some embodiments the one or more rules can be extracted from the applications 132 and/or domain services, for example. In some embodiments, the rule extractor 114 can also determine and extract information related to application programming interface (API) contracts and/or message contracts between different ones of the applications 132, if needed. It is noted that in this context, a "contract" is intended to be broadly construed so as to encompass a description of the API and/or messages. As an example, the applications 132 can be configured to receive and/or send data in different ways. The information related to API and/or message contract information can be used, for example, to determine whether and how a change to one or more attributes affects a given one of the applications 132. As a non-limiting example, the information related to the API and/or message contracts can include one or more function parameters and/or an order of the one or more function parameters.

The attribute dependency identifier 116 is configured to determine dependencies of attributes across the applications 132. In some embodiments, the applications 132 can correspond to different programming languages, and the attribute dependency identifier 116 can apply one or more rules to determine the dependencies between the different program languages. For example, the extracted attributes, the extracted rules, and/or the information related to the API and/or message contracts can be used to identify dependency information across different programming languages, and this information can be used by the dependency model generation logic 118 to build a dynamic dependency data model, as described in more detail elsewhere herein.

When a given application makes a change to one or more attributes associated with a request configuration, the attribute impact analyzer 120 can determine one or more other applications 132 that are impacted based on the attribute change(s) to the given application. In at least some embodiments, the attribute impact analyzer 120 can perform one or more automated actions. For example, the automated actions can include at least one of outputting information related to the applications and/or attributes impacted by a given attribute change, sending an alert to one or more developers associated with at least one of the impacted applications, and/or automatically preventing a software merge process associated with at least one application impacted by the change, and/or performing one or more tests with respect to one or more of the impacted applications.

It is to be appreciated that this particular arrangement of elements 112, 114, 116, 118, and 120 illustrated in the application impact determination system 105 of the FIG. 1 embodiment is presented by way of example only, and alternative arrangements can be used in other embodiments. For example, the functionality associated with the elements 112, 114, 116, 118, and 120 in other embodiments can be combined into a single module, or separated across a larger number of modules. As another example, multiple distinct processors can be used to implement different ones of the elements 112, 114, 116, 118, and 120 or portions thereof.

At least portions of elements 112, 114, 116, 118, and 120 may be implemented at least in part in the form of software that is stored in memory and executed by a processor.

It is to be understood that the particular set of elements shown in FIG. 1 for application impact determination system 105 involving user devices 102 and request processing system 130 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the application impact determination system 105 and database(s) 106 can be on and/or part of the same processing platform.

An exemplary process utilizing elements 112, 114, 116, 118, and 120 of an example application impact determination system 105 in computer network 100 will be described in more detail with reference to, for example, the flow diagram of FIG. 6.

Figure 2:
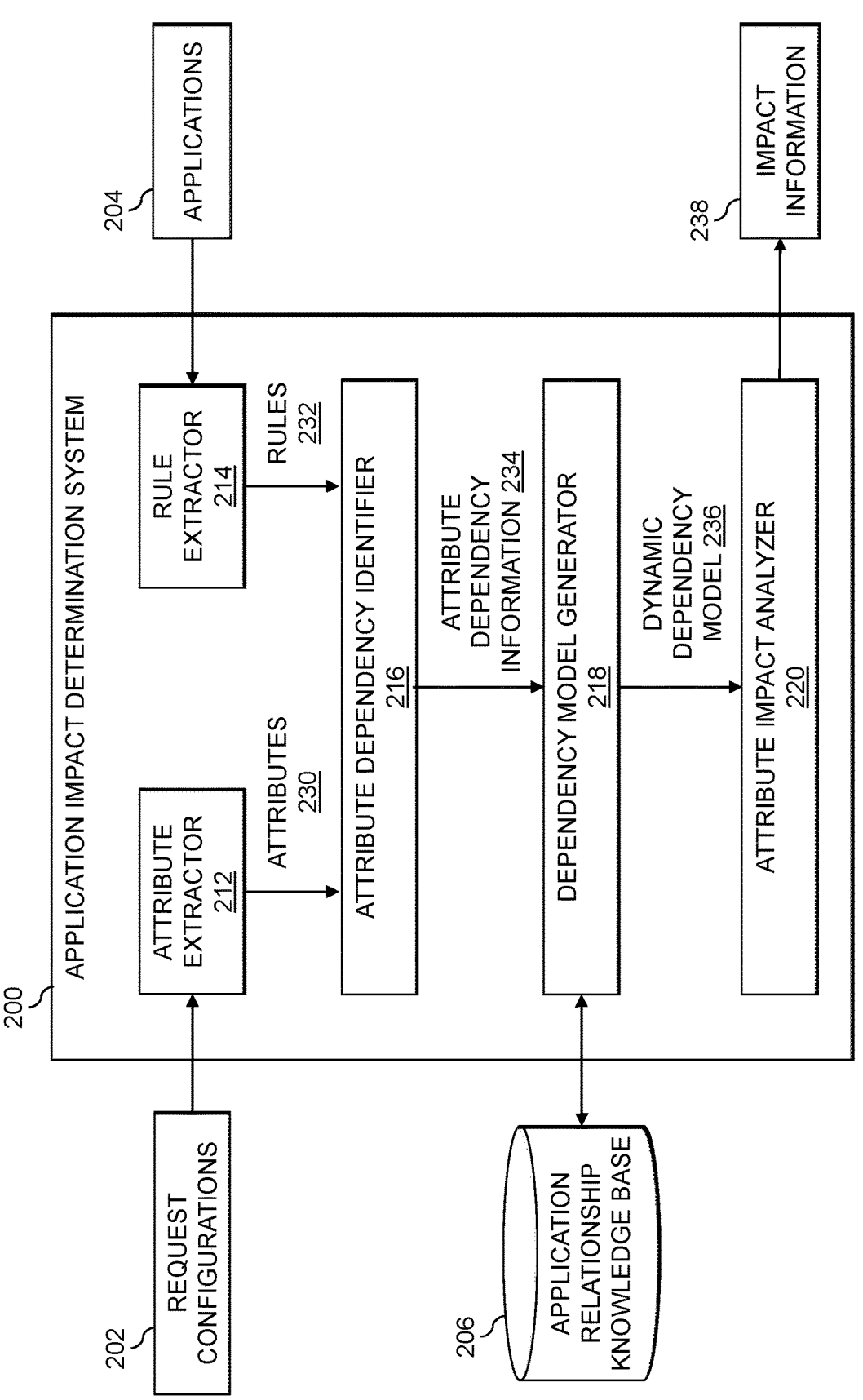
FIG. 2 shows an example architecture of an application impact determination system in an illustrative embodiment.

FIG. 2 shows an example architecture of an application impact determination system 200 in an illustrative embodiment. The application impact determination system 200 can correspond to application impact determination system 105 in FIG. 1, for example.

The application impact determination system 200, in this embodiment, includes an attribute extractor 212, which extracts or identifies one or more attributes 230 related to one or more request configurations 202. Also, a rule extractor 214 extracts one or more rules 232 corresponding to at least some of the attributes 230. For example, the one or more rules 232 can be read from one or more applications 204 (e.g., such as by reading the rule from the tax application in the example above). Accordingly, the application impact determination system 200 can maintain the one or more rules 232 across the applications 204.

An attribute dependency identifier 216 generates attribute dependency information 234, based on the attributes 230 and rules 232. The attribute dependency information 234, in some embodiments, includes information identifying different types of attribute dependencies (e.g., direct, indirect, and/or cascading dependencies).

The application impact determination system 200 also includes a dependency model generator 218, which identifies dependencies between different applications based on information stored in an application relationship knowledge base 206. For example, the application relationship knowledge base 206 can include dependencies between the applications 204. When a change is made to an attribute corresponding to a given one of the applications 204, then the applications dependent on the given application for the changed attribute can be identified using the application relationship knowledge base 206. The dependency model generator 218 generates a dynamic dependency model 236 using the attribute dependency information 234 and the information in the application relationship knowledge base 206. The dynamic dependency model 236, in some embodiments, includes a graph that maps attribute and rule dependencies, and a data structure for storing the relationships between the attribute and the rules.

The dynamic dependency model 236, in some embodiments, includes a graph data structure. When there is a change to a given one of the attributes 230, the graph data structure can include the following layers:

a first layer indicating direct dependencies between the changed attribute and one or more of the applications 204;

a second layer indicating dependencies between: (i) the changed attribute, (ii) one or more attributes dependent on the changed attribute, and (iii) applications corresponding to the dependent attributes; and a third layer indicating relationships between the applications 204 for a given attribute.

The first layer of the dynamic dependency model 236 can be used to identify direct dependency relationships, the second layer can be used to identify indirect relationships, and the third layer can be used to identify cascading relationships, for example. It is noted that the second layer can include 'N' levels of attribute-to-attribute dependencies, where the last node corresponds to an application. This relationship can be determined based on the rules associated with each application. Also, at least some embodiments can implement the dynamic dependency model 236 as a data structure (e.g., a linked list data structure) that stores the information corresponding to the relationships above.

An attribute impact analyzer 220 uses the dynamic dependency model 236 to generate impact information 238, which can include information specifying the relationships and/or applications affected by changes to attributes.

FIG. 3 shows a process flow diagram for generating a dependency data model in an illustrative embodiment. It is to be understood that this particular process is only an example, and additional or alternative processes can be carried out in other embodiments. In this embodiment, the process includes steps 300 through 308.

Step 300 includes identifying one or more attributes associated with one or more request configurations. Step 302 includes identifying one or more rules in applications related to the identified one or more attributes. Step 304 includes determining dependencies of the one or more attributes based on the one or more rules. Step 306 includes storing application-to-application dependency information for each of the one or more attributes in a knowledge base. Step 308 includes generating a dependency data model, for example, based at least in part on the dependencies identified in steps 304 and 306.

Figure 4:
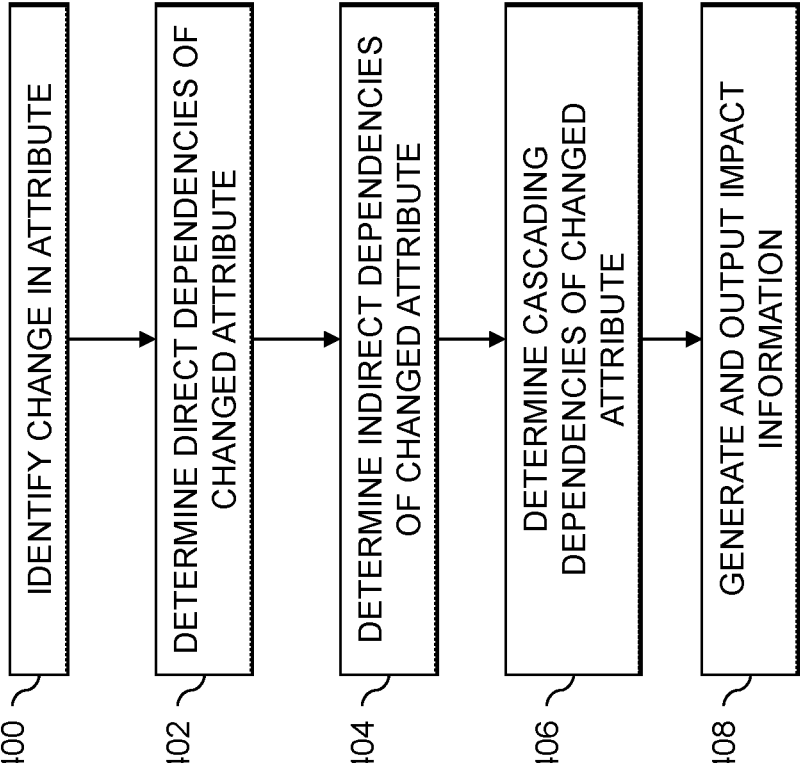
FIG. 4 shows a process flow diagram for identifying applications impacted by an attribute change in an illustrative embodiment.

FIG. 4 shows a process flow diagram for identifying applications impacted by an attribute change in an illustrative embodiment. It is to be understood that this particular process is only an example, and additional or alternative processes can be carried out in other embodiments. In this embodiment, the process includes steps 400 through 408.

Step 400 includes identifying a change in an attribute. In some embodiments, the change can be detected automatically. Additionally, or alternatively, the change to the attribute can be provided by a user to determine how it will impact the applications, where the change may not yet be implemented in any application. Step 402 includes determining direct dependencies of the changed attribute, step 404 includes determining indirect dependencies of the changed attribute, and step 406 includes determining cascading dependencies of the changed attribute. Step 408 includes generating and outputting impact information based at least in part on the dependencies identified in steps 402-406.

Figure 5:
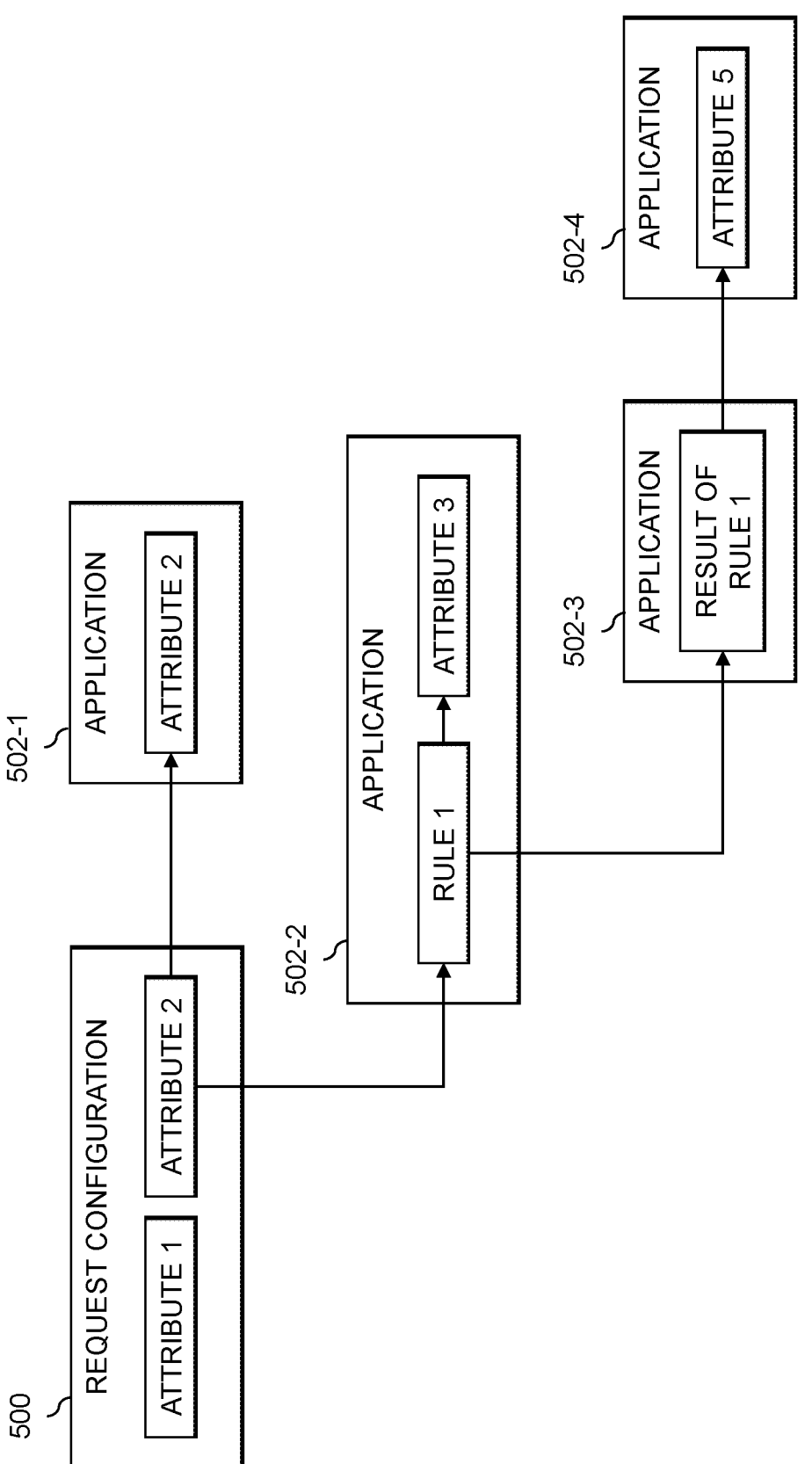
FIG. 5 is a diagram showing relationships between applications for a given attribute in an illustrative embodiment.

FIG. 5 is a diagram showing relationships between applications for a given attribute in an illustrative embodiment. The FIG. 5 example can represent at least a part of a dependency data model, for example.

In this example, it is assumed that a request configuration 500 comprises two attributes (attribute 1 and attribute 2) and a change has been made to attribute 2. The change to attribute 2 can correspond to adding one or more values to the attribute 2, modifying one or more values of the attribute 2, and/or deleting one or more values associated with attribute 2, for example.

FIG. 5 also includes applications 502-1, 502-2, 502-3, and 502-4. Application 502-1 directly uses attribute 2, and thus can be identified as having a direct impact relationship. Application 502-2 includes a rule (rule 1) that directly uses attribute 2. Thus, application 502-2 can also be identified as having a direct impact relationship. It is noted that application 502-2 also includes attribute 3, which is determined based at least in part on rule 1. The result of rule 1 is used by application 502-3, and thus application 502-3 can be identified as having an indirect impact relationship. Application 502-4 uses the result of rule 1 from application 502-3 to determine attribute 5, and thus application 502-4 can be identified as having a cascaded dependency relationship.

Figure 6:
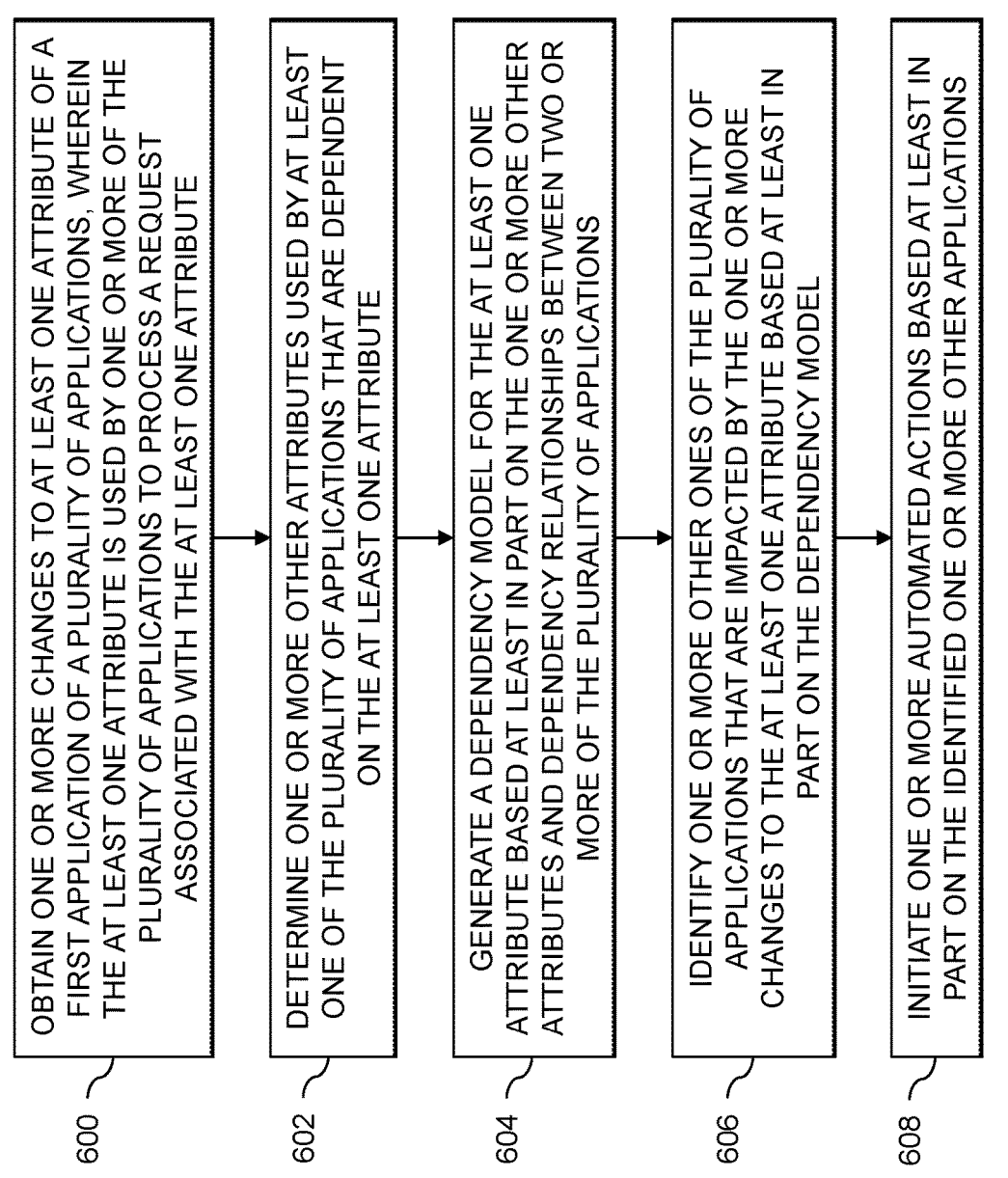
FIG. 6 shows a flow diagram of a process for identifying applications impacted by request-related attribute changes in an illustrative embodiment.

FIG. 6 is a flow diagram of a process for identifying applications impacted by request-related attribute changes in an illustrative embodiment. It is to be understood that this particular process is only an example, and additional or alternative processes can be carried out in other embodiments.

In this embodiment, the process includes steps 600 through 608. These steps are assumed to be performed by the application impact determination system 105 utilizing its elements 112, 114, 116, 118, and 120.

Step 600 includes obtaining one or more changes to at least one attribute of a first application of a plurality of applications, wherein the at least one attribute is used by one or more of the plurality of applications to process a request associated with the at least one attribute. Step 602 includes determining one or more other attributes used by at least one of the plurality of applications that are dependent on the at least one attribute. Step 604 includes generating a dependency model for the at least one attribute based at least in part on the one or more other attributes and dependency relationships between two or more of the plurality of applications. Step 606 includes identifying one or more other ones of the plurality of applications that are impacted by the one or more changes to the at least one attribute based at least in part on the dependency model. Step 608 includes initiating one or more automated actions based at least in part on the identified one or more other applications.

The determining the one or more other attributes may include: extracting one or more rules from source code of at least one of the plurality of applications, where the one or more rules involve the at least one attribute and at least one of the other attributes. The dependency model may include information indicating at least one of: a first set of applications including applications that are impacted by the one or more changes based at least in part on a first type of relationship; a second set of applications including applications that are impacted by the one or more changes based at least in part on a second type of relationship; and a third set of applications including applications that are impacted by the one or more changes based at least in part on a third type of relationship. The first type of relationship may include a direct relationship; the second type of relationship may include an indirect relationship; and the third type of relationship may include a cascading relationship. The one or more changes may include at least one of: adding, modifying, and deleting one or more values associated with the at least one attribute. The determining the one or more other attributes used by the at least one of the plurality of applications that are dependent on the at least one attribute may be based on at least one of: information describing at least one application programming interface function used by two or more of the plurality of applications; and information describing one or more message formats used for communication between two or more of the plurality of applications. The one or more automated actions may include at least one of: generating an alert to one or more users associated with at least one of the identified one or more applications; outputting information related to a type of impact the one or more changes have on the identified one or more applications; automatically preventing a software merge process associated with at least one of the plurality of applications impacted by the one or more changes; and automatically performing one or more software tests corresponding to the identified one or more other applications. The plurality of applications may be developed using at least two different programming languages.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the efficiency in which applications can be updated to accommodate changes to one or more attributes of a request configuration. Such embodiments can also, for example, help avoid unexpected behavior and errors due to such changes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
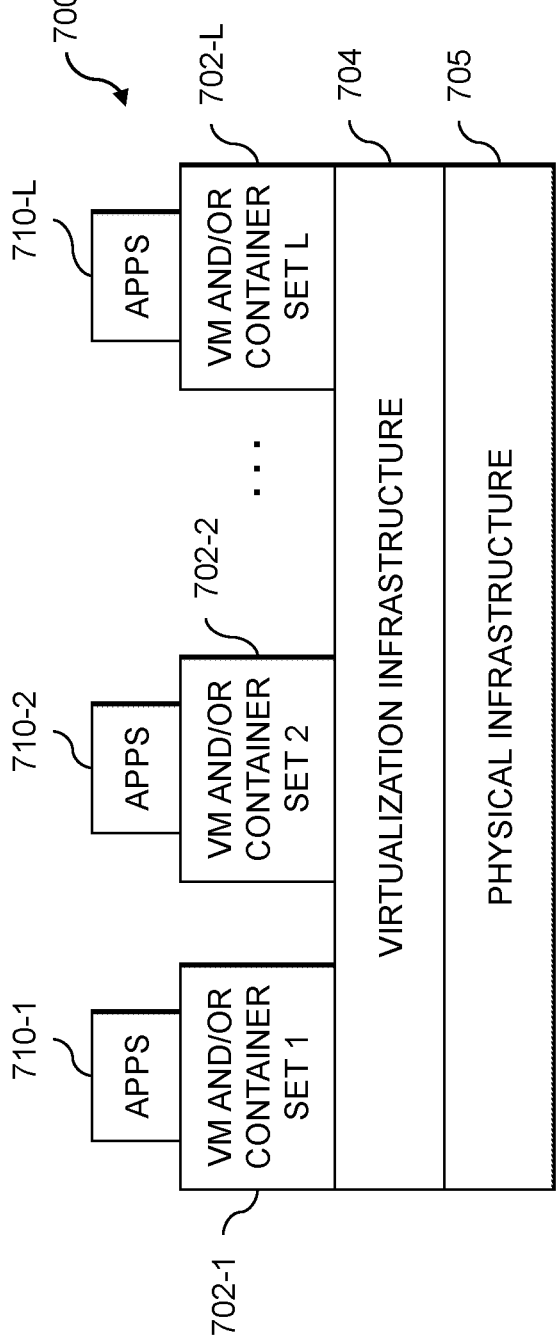
FIGS. 7 and 8 show examples of processing platforms that may be utilized to implement at least a portion of an information processing system in illustrative embodiments.
Figure 8:
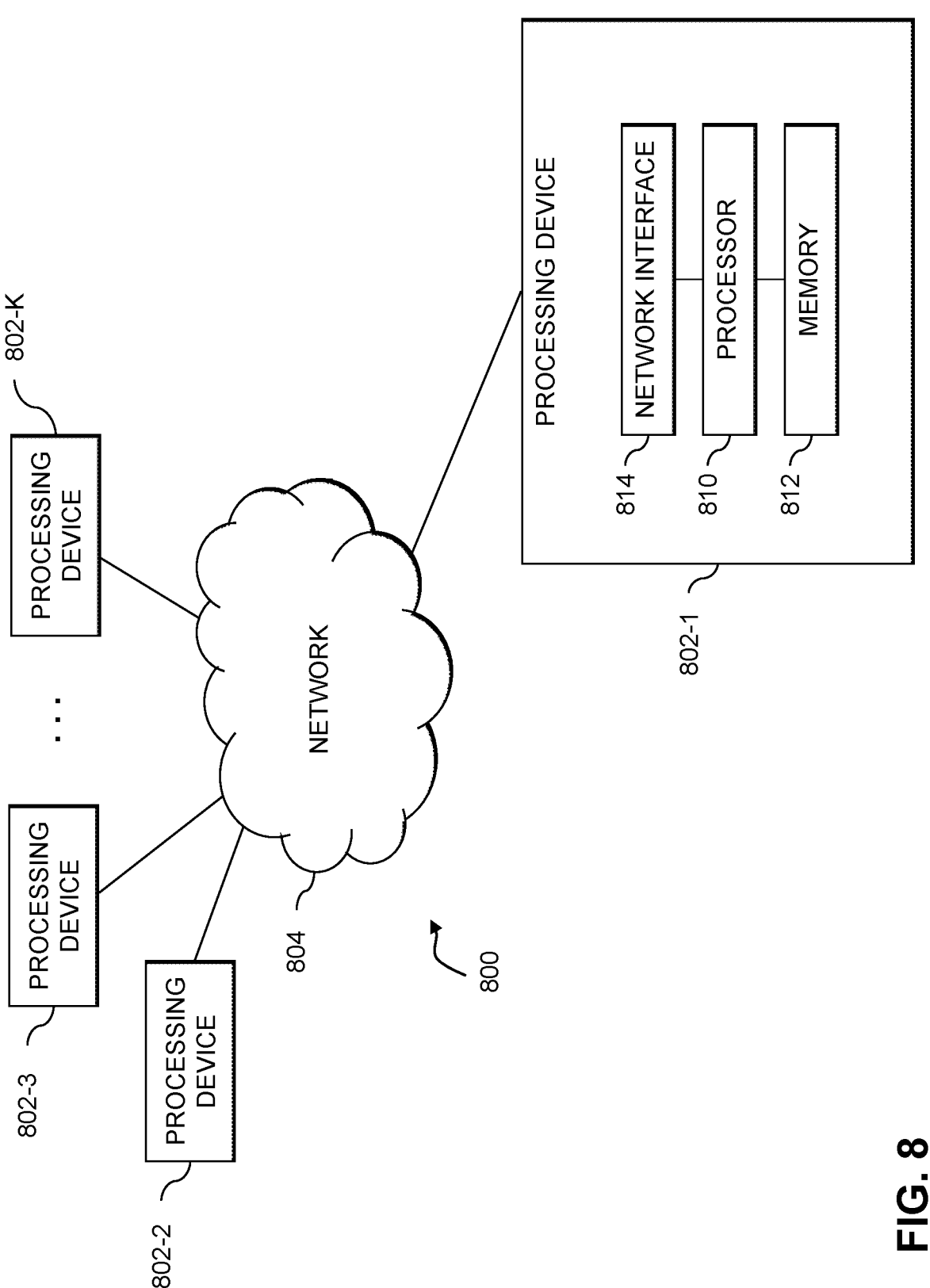

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an ASIC, an FPGA or other type of processing circuitry, as well as portions or combinations of such circuitry elements.

The memory 812 comprises RAM, ROM or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining one or more changes to at least one attribute of a first application of a plurality of applications, wherein the at least one attribute is used by one or more of the plurality of applications to process a request associated with the at least one attribute;
determining one or more other attributes used by at least one of the plurality of applications that are dependent on the at least one attribute, wherein the determining comprises: (i) extracting one or more rules from source code of at least one of the plurality of applications, wherein the one or more rules involve the at least one attribute and at least one of the other attributes; and (ii) determining information describing at least one of an application programming interface and a message format used for communication between two or more of the plurality of applications, wherein the determined information comprises at least one of one or more function parameters and an order of the one or more function parameters;
generating a dependency model for the at least one attribute based at least in part on the one or more other attributes and dependency relationships between two or more of the plurality of applications;
identifying one or more other ones of the plurality of applications that are impacted by the one or more changes to the at least one attribute based at least in part on the dependency model, wherein the identifying comprises utilizing the determined information to determine whether the one or more changes affect a given one of the plurality of applications; and
initiating one or more automated actions based at least in part on the identified one or more other applications;
wherein the method is performed by at least one processing device comprising a processor coupled to a memory.

2. The computer-implemented method of claim 1, wherein the dependency model comprises information indicating at least one of:
a first set of applications comprising applications that are impacted by the one or more changes based at least in part on a first type of relationship;
a second set of applications comprising applications that are impacted by the one or more changes based at least in part on a second type of relationship; and
a third set of applications comprising applications that are impacted by the one or more changes based at least in part on a third type of relationship.

3. The computer-implemented method of claim 2, wherein:
the first type of relationship comprises a direct relationship;
the second type of relationship comprises an indirect relationship; and the third type of relationship comprises a cascading relationship.

4. The computer-implemented method of claim 1, wherein the one or more changes comprise at least one of: adding, modifying, and deleting one or more values associated with the at least one attribute.

5. The computer-implemented method of claim 1, wherein the one or more automated actions comprise at least one of:

generating an alert to one or more users associated with at least one of the identified one or more other applications;

outputting information related to a type of impact the one or more changes have on the identified one or more other applications;

automatically preventing a software merge process associated with at least one of the plurality of applications impacted by the one or more changes; and automatically performing one or more software tests corresponding to the identified one or more other applications.

6. The computer-implemented method of claim 1, wherein the plurality of applications is developed using at least two different programming languages.

7. A non-transitory processor-readable storage medium having stored therein program code of one or more software programs, wherein the program code when executed by at least one processing device causes the at least one processing device:

to obtain one or more changes to at least one attribute of a first application of a plurality of applications, wherein the at least one attribute is used by one or more of the plurality of applications to process a request associated with the at least one attribute;

to determine one or more other attributes used by at least one of the plurality of applications that are dependent on the at least one attribute, wherein the determining comprises: (i) extracting one or more rules from source code of at least one of the plurality of applications, wherein the one or more rules involve the at least one attribute and at least one of the other attributes; and (ii) determining information describing at least one of an application programming interface and a message format used for communication between two or more of the plurality of applications, wherein the determined information comprises at least one of one or more function parameters and an order of the one or more function parameters;

to generate a dependency model for the at least one attribute based at least in part on the one or more other attributes and dependency relationships between two or more of the plurality of applications;

to identify one or more other ones of the plurality of applications that are impacted by the one or more changes to the at least one attribute based at least in part on the dependency model, wherein the identifying comprises utilizing the determined information to determine whether the one or more changes affect a given one of the plurality of applications; and to initiate one or more automated actions based at least in part on the identified one or more other applications.

8. The non-transitory processor-readable storage medium of claim 7, wherein the dependency model comprises information indicating at least one of:

a first set of applications comprising applications that are impacted by the one or more changes based at least in part on a first type of relationship;

a second set of applications comprising applications that are impacted by the one or more changes based at least in part on a second type of relationship; and a third set of applications comprising applications that are impacted by the one or more changes based at least in part on a third type of relationship.

9. The non-transitory processor-readable storage medium of claim 8, wherein:

the first type of relationship comprises a direct relationship;

the second type of relationship comprises an indirect relationship; and the third type of relationship comprises a cascading relationship.

10. The non-transitory processor-readable storage medium of claim 7, wherein the one or more changes comprise at least one of: adding, modifying, and deleting one or more values associated with the at least one attribute.

11. An apparatus comprising:

at least one processing device comprising a processor coupled to a memory;

the at least one processing device being configured:

to obtain one or more changes to at least one attribute of a first application of a plurality of applications, wherein the at least one attribute is used by one or more of the plurality of applications to process a request associated with the at least one attribute;

to determine one or more other attributes used by at least one of the plurality of applications that are dependent on the at least one attribute, wherein the determining comprises: (i) extracting one or more rules from source code of at least one of the plurality of applications, wherein the one or more rules involve the at least one attribute and at least one of the other attributes; and (ii) determining information describing at least one of an application programming interface and a message format used for communication between two or more of the plurality of applications, wherein the determined information comprises at least one of one or more function parameters and an order of the one or more function parameters;

to generate a dependency model for the at least one attribute based at least in part on the one or more other attributes and dependency relationships between two or more of the plurality of applications;

to identify one or more other ones of the plurality of applications that are impacted by the one or more changes to the at least one attribute based at least in part on the dependency model, wherein the identifying comprises utilizing the determined information to determine whether the one or more changes affect a given one of the plurality of applications; and to initiate one or more automated actions based at least in part on the identified one or more other applications.

12. The apparatus of claim 11, wherein the dependency model comprises information indicating at least one of:

a first set of applications comprising applications that are impacted by the one or more changes based at least in part on a first type of relationship;

a second set of applications comprising applications that are impacted by the one or more changes based at least in part on a second type of relationship; and a third set of applications comprising applications that are impacted by the one or more changes based at least in part on a third type of relationship.

13. The apparatus of claim 12, wherein:

the first type of relationship comprises a direct relationship;

the second type of relationship comprises an indirect relationship; and the third type of relationship comprises a cascading relationship.

14. The apparatus of claim 11, wherein the one or more changes comprise at least one of: adding, modifying, and deleting one or more values associated with the at least one attribute.

15. The computer-implemented method of claim 1, further comprising:

determining a level of impact for the one or more changes, wherein the level of impact comprises a probability of whether the one or more changes will result in an error in at least one of the identified one or more other applications.

16. The non-transitory processor-readable storage medium of claim 9, further comprising:

determining a level of impact for the one or more changes, wherein the level of impact comprises a probability of whether the one or more changes will result in an error in at least one of the identified one or more other applications.

17. The apparatus of claim 11, further comprising:

determining a level of impact for the one or more changes, wherein the level of impact comprises a probability of whether the one or more changes will result in an error in at least one of the identified one or more other applications.

18. The non-transitory processor-readable storage medium of claim 7, wherein the one or more automated actions comprise at least one of:

generating an alert to one or more users associated with at least one of the identified one or more other applications;

outputting information related to a type of impact the one or more changes have on the identified one or more other applications;

automatically preventing a software merge process associated with at least one of the plurality of applications impacted by the one or more changes; and automatically performing one or more software tests corresponding to the identified one or more other applications.

19. The non-transitory processor-readable storage medium of claim 7, wherein the plurality of applications is developed using at least two different programming languages.

20. The apparatus of claim 11, wherein the one or more automated actions comprise at least one of:

generating an alert to one or more users associated with at least one of the identified one or more other applications;

outputting information related to a type of impact the one or more changes have on the identified one or more other applications;

automatically preventing a software merge process associated with at least one of the plurality of applications impacted by the one or more changes; and automatically performing one or more software tests corresponding to the identified one or more other applications.

* * * * *